US012036648B2

(12) United States Patent
Miyashita

(10) Patent No.: US 12,036,648 B2
(45) Date of Patent: Jul. 16, 2024

(54) DRIVING TOOL

(71) Applicant: MAKITA CORPORATION, Anjo (JP)

(72) Inventor: Isao Miyashita, Anjo (JP)

(73) Assignee: MAKITA CORPORATION, Anjo (JP)

( * ) Notice: Subject to any disclaimer, the term of this patent is extended or adjusted under 35 U.S.C. 154(b) by 182 days.

(21) Appl. No.: 17/839,914

(22) Filed: Jun. 14, 2022

(65) Prior Publication Data

US 2023/0021341 A1 Jan. 26, 2023

(30) Foreign Application Priority Data

Jul. 20, 2021 (JP) ................................ 2021-119444

(51) Int. Cl.
*B25C 1/06* (2006.01)
*B25C 1/00* (2006.01)

(52) U.S. Cl.
CPC ................ *B25C 1/008* (2013.01); *B25C 1/06* (2013.01)

(58) Field of Classification Search
None
See application file for complete search history.

(56) References Cited

U.S. PATENT DOCUMENTS

| | | | |
|---|---|---|---|
| 8,387,718 B2 | 3/2013 | Leimbach et al. | |
| 10,377,026 B2 * | 8/2019 | Kondou .................... | B25C 1/06 |

* cited by examiner

*Primary Examiner* — Praachi M Pathak
(74) *Attorney, Agent, or Firm* — Oliff PLC

(57) ABSTRACT

A driving tool with a mechanical spring uses urging force from a striking spring as driving force and switches its operation mode. The tool includes a striking driver to strike a fastener, a striking spring urging the driver in a driving direction, a contact arm movable to a retracted position in a counter-driving direction in response to pressing against a workpiece, a trigger movable to an on-position in response to user operation, and a mode selector switch to switch the operation mode between continuous drive mode and single drive mode. A driving operation is performed in the continuous drive mode in response to the contact arm moving to the retracted position and the trigger moving to the on-position in any order, and in the single drive mode in response to the contact arm moving to the retracted position and the trigger moving to the on-position in the stated order.

12 Claims, 13 Drawing Sheets

DRIVING TOOL

CROSS-REFERENCE TO RELATED APPLICATIONS

This application claims the benefit of priority to Japanese Patent Application No. 2021-119444, filed on Jul. 20, 2021, the entire contents of which are hereby incorporated by reference.

BACKGROUND

1. Technical Field

The present disclosure relates to a hand-held driving tool referred to as, for example, a rechargeable nailer typically for joining floor panels or plasterboards at construction sites.

2. Description of the Background

A known driving tool with a mechanical spring uses an urging force from a compression spring as a driving force. The driving tool with a mechanical spring includes a striking driver that moves forward in the driving direction under an urging force from the compression spring and strikes a fastener. In response to an on-operation on a driving nose or a contact arm (pressing a workpiece) and an on-operation on a trigger (pull), the striking driver returns to a backward end position and then moves forward under an urging force from the compression spring, performing a driving operation. The striking driver returns from a forward end position (initial position) to the backward end position with a driver lifter, which is powered by an electric motor.

A driving tool with a gas spring described in U.S. Pat. No. 8,387,718 performs a driving operation under a force produced by a compressed gas. The driving tool with a gas spring includes a sensor to detect an on-operation on the driving nose and an on-operation on the trigger. A controller controls the operation of an electric motor included in a driver lifter. The controller controls the driving operation modes (a continuous drive mode and a single drive mode) in response to an on-operation on the driving nose and an on-operation on the trigger both detected by a sensor.

In the continuous drive mode, the driving operation is performed in response to an on-operation on the driving nose and an on-operation on the trigger performed in any order of the operations. In the continuous drive mode, the driving operation is performed in response to an on-operation first performed on the driving nose and then performed on the trigger, or in response to an on-operation first performed on the trigger and then performed on the driving nose. The continuous drive mode thus allows a swing driving operation that is a continuous driving operation performed at multiple positions on a workpiece with the driving tool being moved, and repeated on-operations performed on the driving nose while the trigger remains on. The continuous drive mode also allows a drag driving operation that is a continuous driving operation performed at multiple positions on a workpiece with the driving tool being moved, and repeated on-operations performed on the trigger while the driving nose remains on.

In the single drive mode (sequential mode), the driving operation is performed in response to an on-operation first performed on the driving nose and then performed on the trigger. When the on-operation is performed on the trigger first, no driving operation is performed. In this case, the on-operation on the trigger is to be canceled. In the single drive mode, another driving operation is permitted in response to both the trigger and the driving nose being turned off after a single driving operation.

BRIEF SUMMARY

A driving tool with a mechanical spring also involves control of switching of the driving operation between the continuous drive mode and the single drive mode. A driving tool with a mechanical spring according to one or more aspects of the present disclosure includes a controller that controls switching between the driving operation modes.

A first aspect of the present disclosure provides a driving tool, including:

- a striking driver movable in a driving direction to strike a fastener;
- a striking spring urging the striking driver in the driving direction;
- a contact arm movable in a counter-driving direction opposite to the driving direction, the contact arm being movable to a retracted position in the counter-driving direction in response to being pressed against a workpiece;
- a trigger movable to an on-position in response to an operation performed by a user; and
- a mode selector switch operable to switch an operation mode between a continuous drive mode and a single drive mode,
- wherein in the continuous drive mode, a driving operation is performed in response to the contact arm moving to the retracted position and the trigger moving to the on-position in an order of movement being the contact arm and the trigger or the trigger and the contact arm, and
- in the single drive mode, the driving operation is performed in response to the contact arm moving to the retracted position and the trigger moving to the on-position in an order of movement being the contact arm and the trigger.

The driving tool according to the above aspect with a mechanical spring allows switching between a continuous drive mode and a single drive mode.

DETAILED DESCRIPTION

Figure 1:
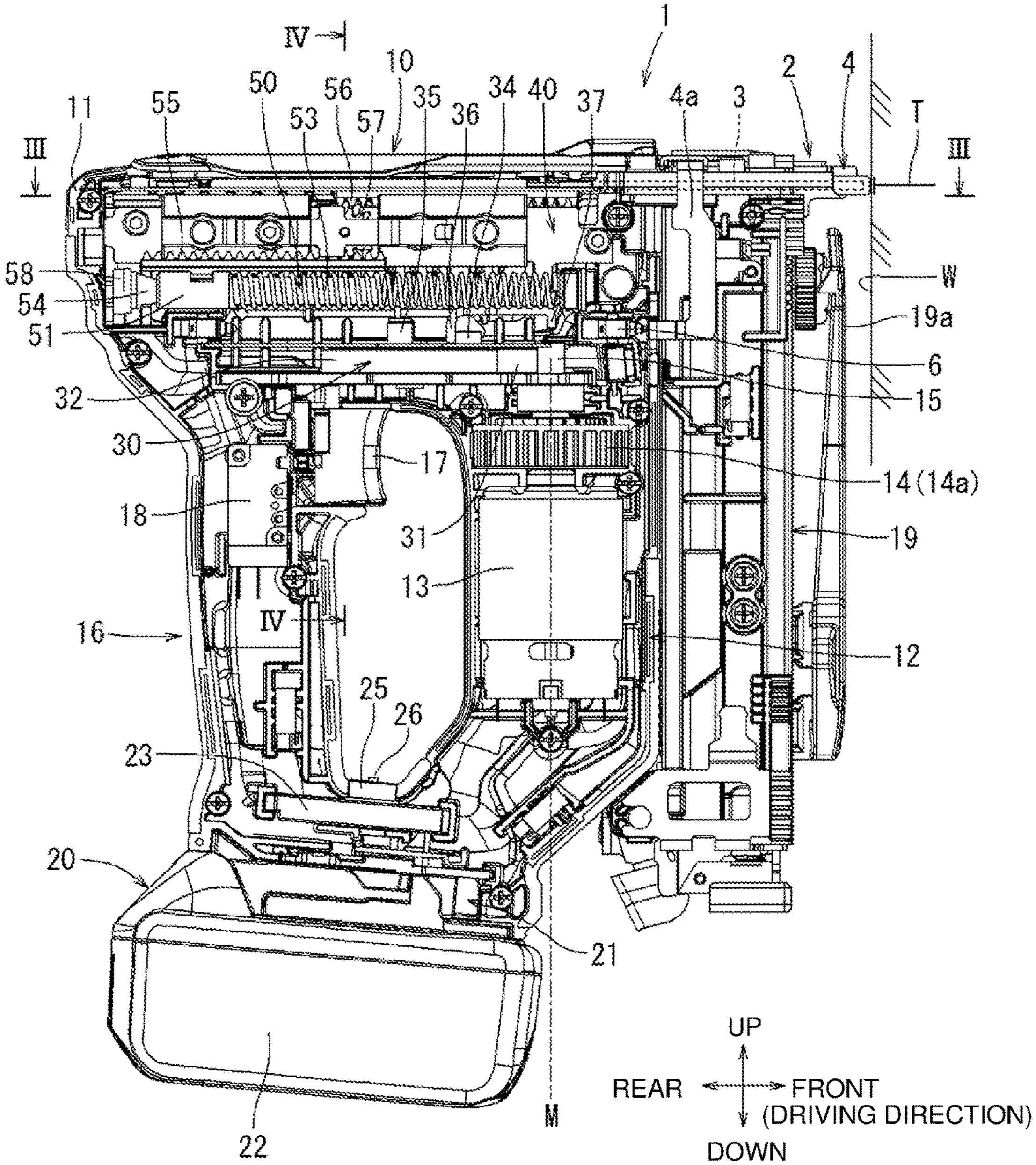
FIG. 1 is a side view of a driving tool partially showing its cross section.
Figure 2:
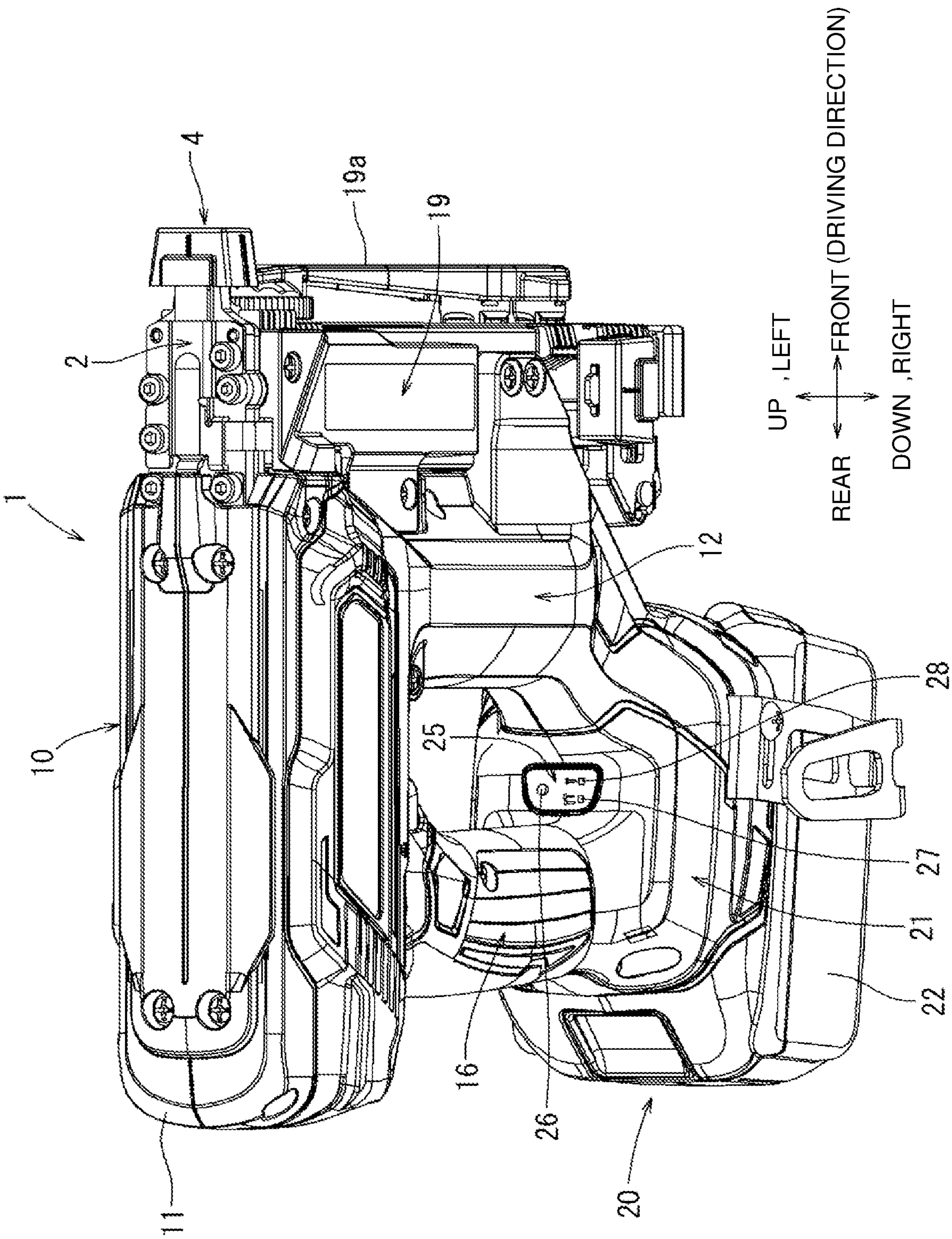
FIG. 2 is a perspective view of the driving tool.
Figure 3:
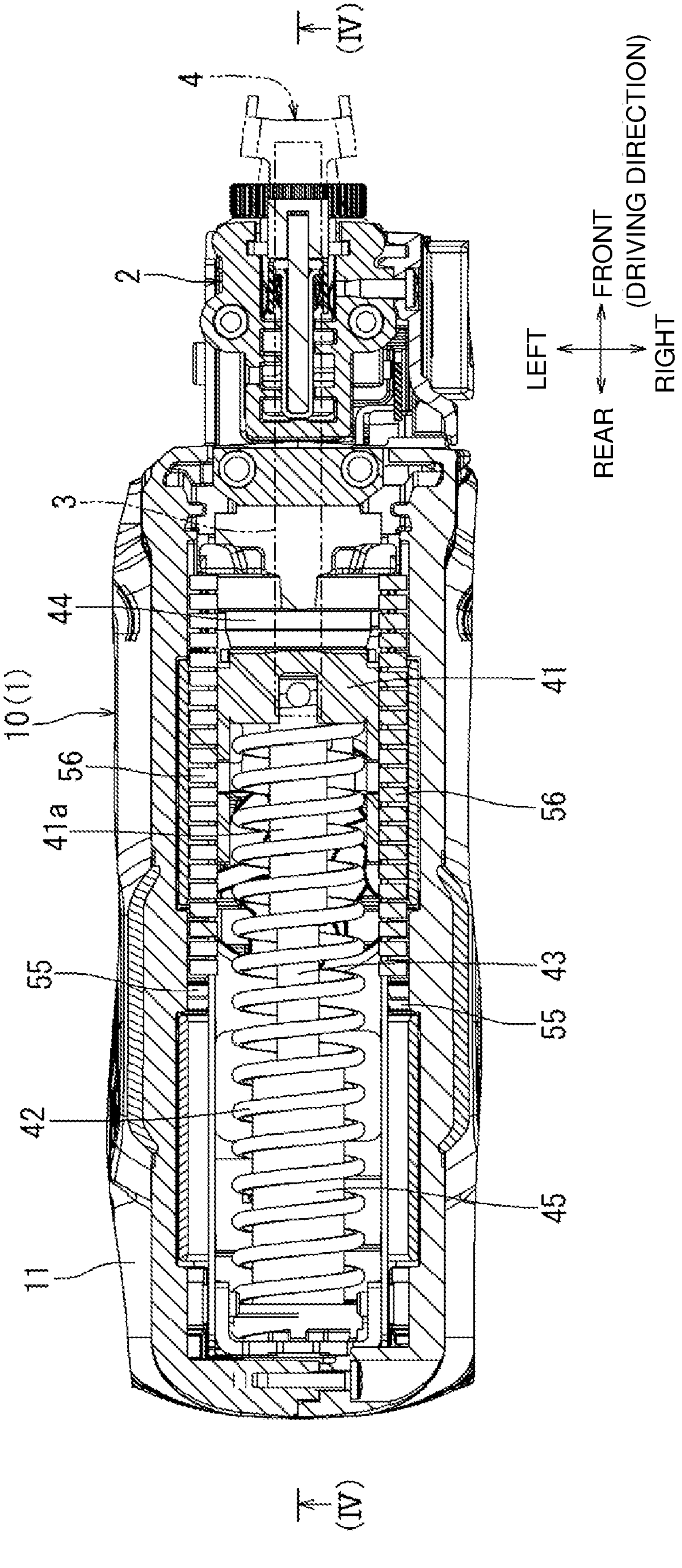
FIG. 3 is a longitudinal view of a tool body taken along line in FIG. 1, as viewed in the direction indicated by arrows.
Figure 4:
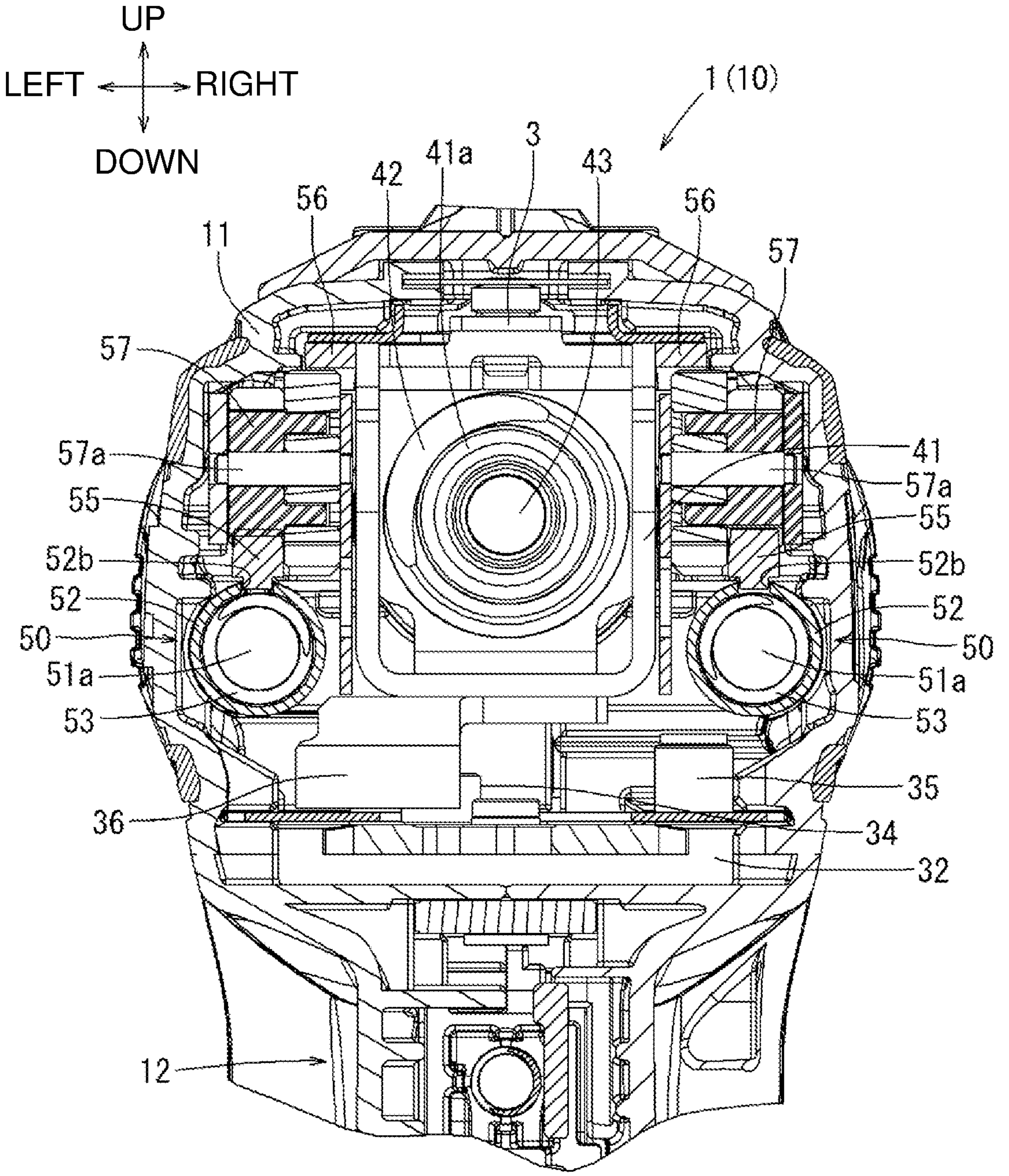
FIG. 4 is a cross-sectional view of the tool body in the lateral width direction taken along line IV-IV in FIG. 1, as viewed in the direction indicated by arrows.

As shown in FIGS. 1 and 2, a driving tool 1 according to an embodiment is a rechargeable nailer with a mechanical spring that uses an urging force from a compression coil spring as a striking force (driving force). The driving tool 1 includes a tool body 10, a motor compartment 12, a grip 16, a magazine 19, and a power supply 20. The motor compartment 12 accommodates an electric motor 13 as a drive source. A user holds the grip 16. The magazine 19 is loaded with many fasteners T. The tool body 10 includes a body housing 11 accommodating a driver lifter 30, a striker 40, and reaction absorbers 50. Hereafter, the driving direction in which the fastener T is driven is forward, and the direction opposite to the driving direction, or the counter-driving direction, is backward. The right-left direction is defined as viewed from the user.

The tool body 10 includes a driving nose 2 at its front. The driving nose 2 guides a striking driver 3 in the driving direction. The striking driver 3 for driving a fastener moves forward on a driving path in the driving nose 2 to strike a fastener T. The fastener T is then ejected through a port at the front end of the nose 2. The fastener T ejected through the port is driven into a workpiece W.

The driving nose 2 receives a contact arm 4. The contact arm 4 extends in the front-rear direction along the driving nose 2. The contact arm 4 is supported in a manner movable in the front-rear direction relative to the driving nose 2. The contact arm 4 has its front end frontward from the front end (port) of the driving nose 2. The contact arm 4 is urged relatively forward by a compression spring 5 located between the contact arm 4 and the driving nose 2.

With the front end of the contact arm 4 in contact with the workpiece W, the driving tool 1 is pushed down. This causes the contact arm 4 to retract backward relative to the driving nose 2 against the compression spring 5. The driving operation is performed in response to the contact arm 4 retracting to a retracted position (on-operation) as a condition for operation.

Figure 5:
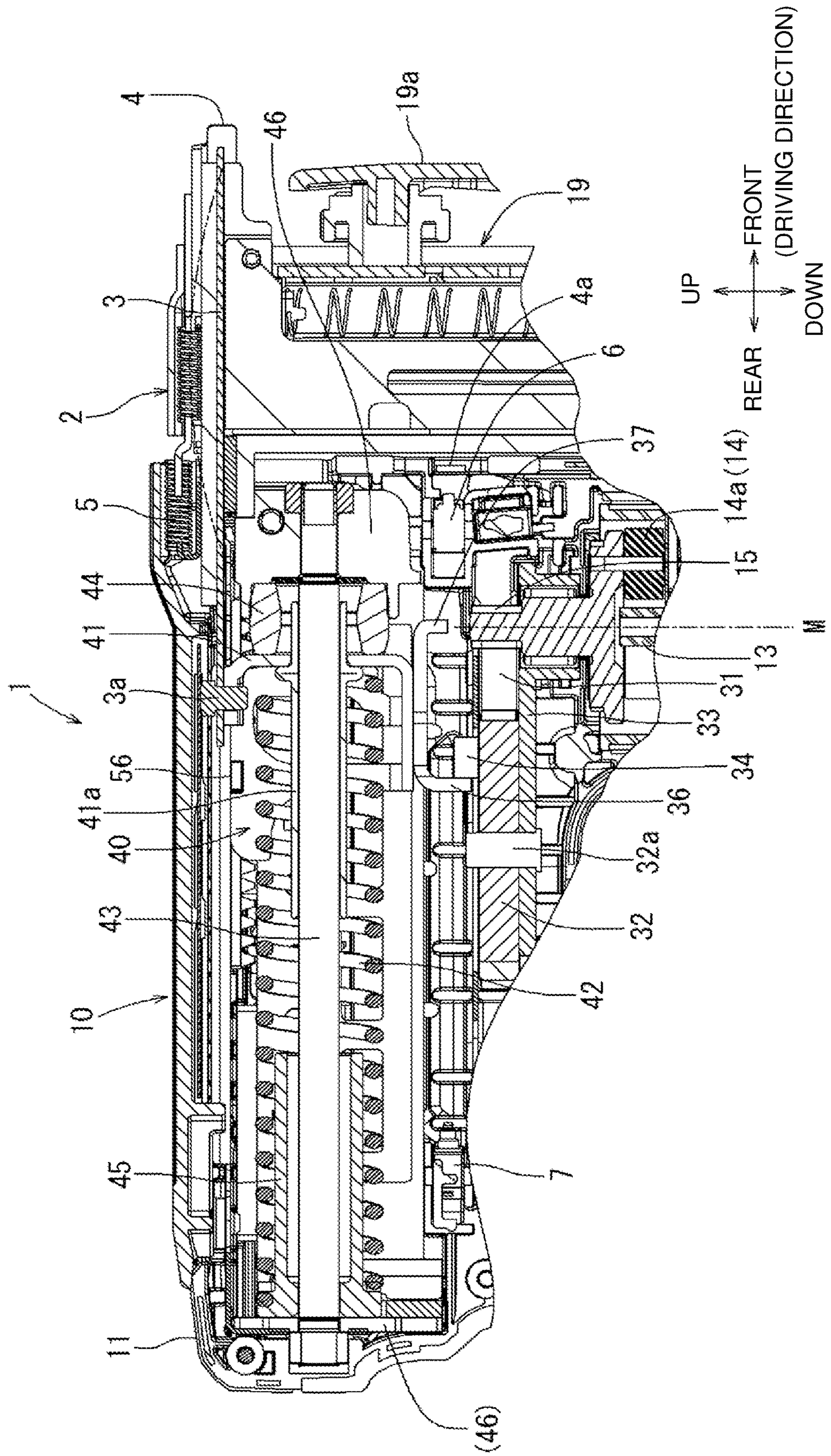
FIG. 5 is a longitudinal sectional view of the tool body in the longitudinal front-rear direction.
Figure 6:
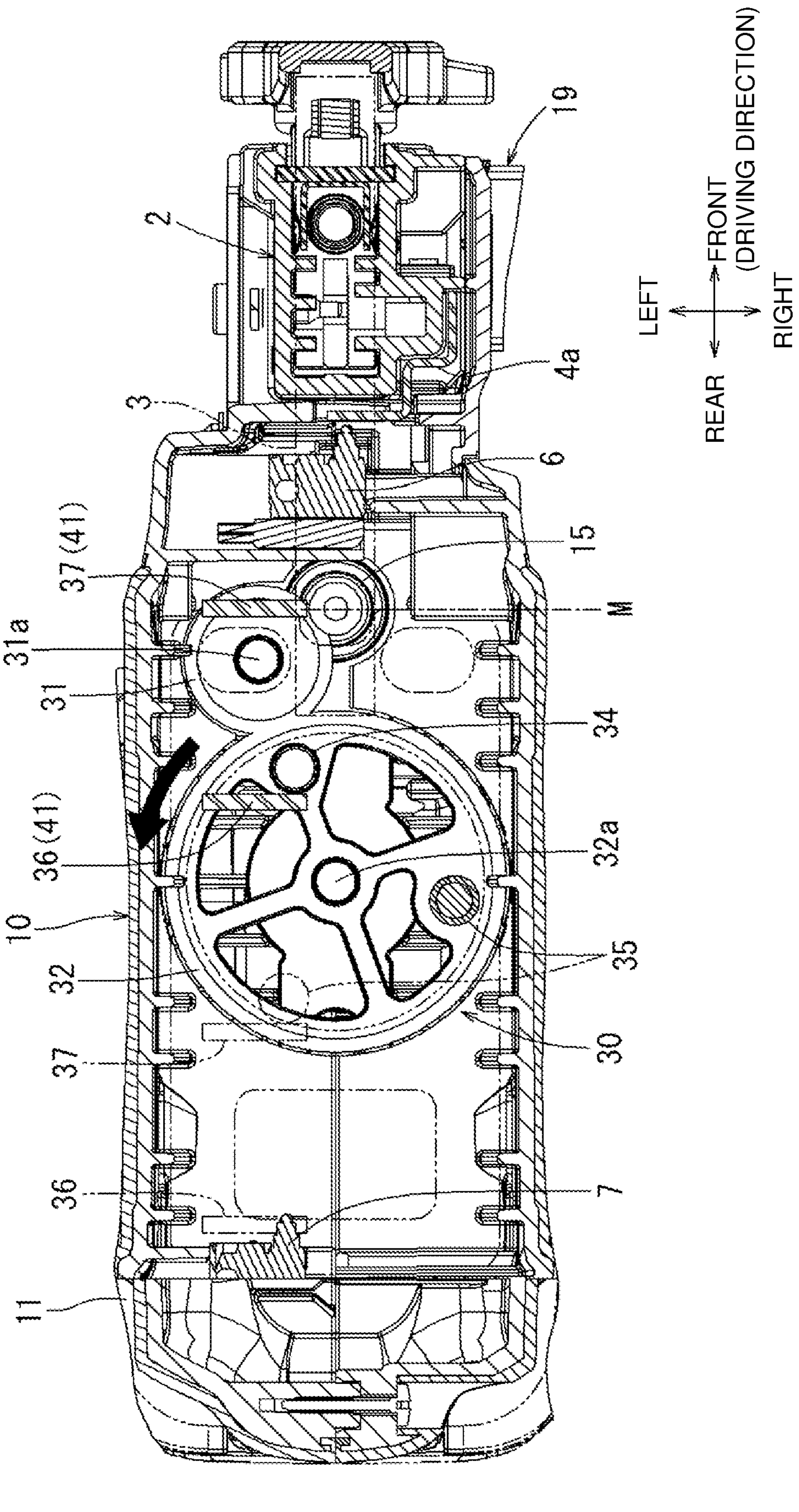
FIG. 6 is a plan view of a driver lifter with a striking driver immediately before returning to a backward end position after the striking driver reaches a forward end position.

The contact arm 4 at the retracted position is detected by a contact arm detector 6. The contact arm detector 6 is located in front of the striker 40. A single microswitch is used for the contact arm detector 6. As shown in FIGS. 1, 5, and 6, the contact arm 4 is integral with a detector arm 4*a*. In response to the contact arm 4 retracting, the detector arm 4*a* approaches the contact arm detector 6 to turn on the contact arm detector 6. In response to a detection signal from the contact arm detector 6 input into a controller 23 (described later), the controller 23 controls the driving operation.

The motor compartment 12 and the grip 16 extend downward from a lower portion of the tool body 10. The motor compartment 12 located frontward and the grip 16 located rearward extend substantially parallel to each other. The motor compartment 12 located frontward accommodates the electric motor 13. The electric motor 13 powers the driver lifter 30. As shown in FIG. 1, the electric motor 13 has a motor axis M extending in a direction (vertical) intersecting with (orthogonal to) the driving direction (front-rear direction).

The driving nose 2 is connected to the magazine 19. The magazine 19 extends downward from the lower surface of the driving nose 2 along the front of the motor compartment 12. The magazine 19 is loaded with a connected fastener. The connected fastener includes many U-shaped fasteners T (referred to as staples) that are temporarily connected in parallel.

The loaded connected fastener is fed with pitches toward the driving nose 2 in cooperation with the driving operation in the tool body 10. One fastener T at a time is fed onto the driving path.

A regulator lever 19*a* for adjusting the driving depth is located at the front of the magazine 19. The regulator lever 19*a* is adjustable back and forth to adjust the driving depth of the fasteners T into the workpiece W. When the driving tool 1 is pushed down until the regulator lever 19*a* comes in contact with the workpiece W, the contact arm 4 retracts. The retraction of the contact arm 4 is detected by the contact arm detector 6. In response to the retraction of the contact arm 4 detected by the contact arm detector 6 as a condition for operation, the electric motor 13 is activated.

A space between the motor compartment 12 and the grip 16 allows the user to place fingers of one hand. The user can hold the grip 16 with the fingers placed in the space. A trigger 17 is located in an upper portion of the grip 16. The trigger 17 is pulled (on-operation) by the user with a fingertip. A trigger detector 18 is located internally behind the trigger 17. In response to the trigger 17 being pulled backward, the trigger detector 18 is turned on. In response to an on-operation on the trigger detector 18 as a condition for operation, the electric motor 13 is activated.

The power supply 20 extends across lower portions of the motor compartment 12 and the grip 16. The power supply 20 includes a battery mount 21 on its lower surface. The battery mount 21 receives a single battery pack 22. The battery pack 22 attached supplies power mainly to the electric motor 13.

The battery pack 22 is substantially rectangular. The battery pack 22 is a lithium-ion battery attachable by sliding. The battery pack 22 is detachable from the battery mount 21 and may be charged with a separate charger to allow repeated use. The battery pack 22 can also be used for other power tools such as rechargeable screw tightening machines or cutting tools, thus being versatile. The battery pack 22 is slidable forward from the rear relative to the battery mount 21 for attachment. The battery mount 21 includes rail receivers for slide attachment.

The battery mount 21 accommodates the controller 23. The controller 23 incorporates a control circuit board for controlling the operation of the electric motor 13, and a power circuit board. A mode display 25 is located on the upper surface of the battery mount 21 above the controller 23. The mode display 25 includes a mode selector switch 26.

An operation performed on the mode selector switch 26 causes switching of the driving operation mode between a continuous drive mode and a single drive mode. The mode display 25 includes indicators 27 and 28 with light-emitting diodes (LEDs) to be illuminated for indicating the selected mode. For the continuous drive mode being selected, the indicator 27 is illuminated. For the single drive mode being selected, the indicator 28 is illuminated. The switching of the driving operation mode will be described later.

As shown in FIG. 5, the striker 40 includes a driver base 41, a striker frame 46, and a striking spring 42. The driver base 41 supports the striking driver 3. The striker frame 46 supports the driver base 41 in a manner movable in the front-rear direction. The striking spring 42 urges the driver base 41 in the driving direction. The striking spring 42 is a compression coil spring without end coils. The striking driver 3 has its rear portion connected to an upper portion of the driver base 41 with a coupling pin 3*a*. The striking driver 3 is an elongated plate that reciprocates back and forth within the driving path in the driving nose 2.

The driver base 41 is integral with a cylindrical support 41*a* extending in the front-rear direction. The striker frame 46 includes a rod-like support shaft 43. The support shaft 43 extends substantially across the full length of the striker frame 46 from the front to the rear. The front and the rear of the support shaft 43 are each connected to the striker frame 46 in a manner axially immovable and nonrotatable about the axis. The striking spring 42 is wound around the support shaft 43.

The support shaft 43 is placed through the inner circumference of the cylindrical support 41*a* without rattling in the radial direction. This allows the driver base 41 to be supported by the striker frame 46 slidably in the front-rear direction. The driver base 41 is restricted from rotating about the axis of the support shaft 43. A single striking spring 42 is located between the driver base 41 and the rear of the striker frame 46. The striking spring 42 urges the driver base 41 and the striking driver 3 in the driving direction. Under an urging force from the striking spring 42, a single fastener T is struck by the striking driver 3 and ejected through the port.

The striker frame 46 includes an elastic member 44 at the front. The elastic member 44 absorbs the impact at the forward end position of the driver base 41. The elastic member 44 is cylindrical. The elastic member 44 surrounds the outer circumference of the support shaft 43. The striker frame 46 includes a cylindrical holding sleeve 45 at the rear. The holding sleeve 45 is inside the inner circumference of the striking spring 42 in a rear portion of the striking spring 42. The holding sleeve 45 can prevent the striking spring 42 from bending or deforming when the striking spring 42 is compressed.

The driver lifter 30, which is driven by the electric motor 13, returns the striking driver 3 to the backward end position. As shown in FIGS. 1, 5, and 6, the rotational output from the electric motor 13 is reduced by a reduction gear box 14 accommodating a planetary gear train 14*a*, and is output to an output gear 15. The output gear 15 is meshed with an idler gear 31.

The idler gear 31 is meshed with a lift gear 32 (base). The idler gear 31 is rotatably supported by a lifter base 33 with a support shaft 31*a*. The lift gear 32 is rotatably supported by the lifter base 33 with a support shaft 32*a*. The lifter base 33 is a thin plate extending in the front-rear direction. The lifter base 33 is fixed below and along the striker frame 46.

With the single idler gear 31 being meshed, the lift gear 32 rotates in the same direction as the output gear 15. The lift gear 32 rotates counterclockwise as indicated by the solid arrow in FIG. 6.

Figure 7:
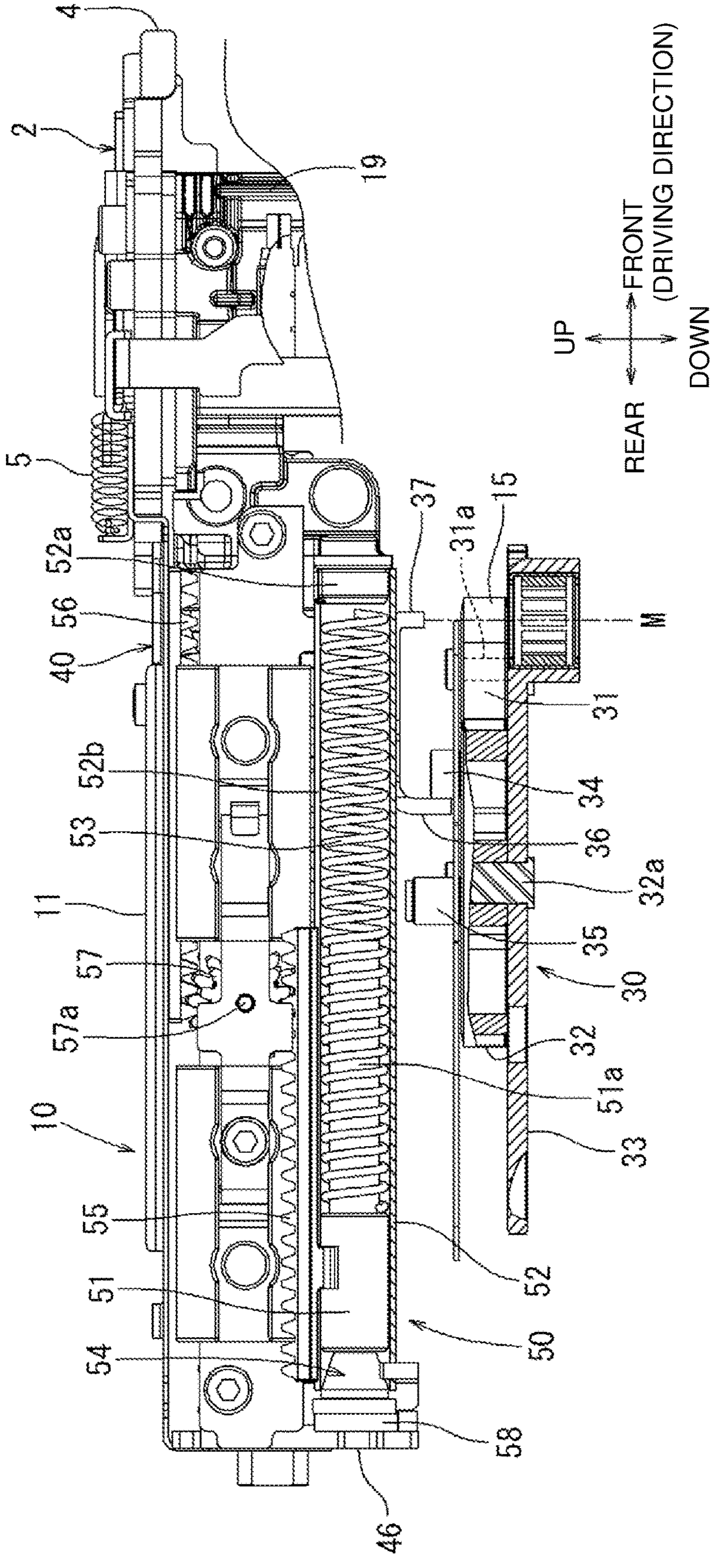
FIG. 7 is a side view of a drive and reaction absorbers.

As shown in FIGS. 6 and 7, the lift gear 32 includes a first engagement portion 34 and a second engagement portion 35 on its upper surface. The first engagement portion 34 and the second engagement portion 35 are cylindrical protrusions having substantially the same diameter. The first engagement portion 34 and the second engagement portion 35 protrude upward. The first engagement portion 34 protrudes upward to substantially half the second engagement portion 35.

As shown in FIG. 6, the first engagement portion 34 and the second engagement portion 35 are decentered by substantially the same distance from the center of rotation of the lift gear 32. The first engagement portion 34 is located forward in the rotational direction by about 100° from the second engagement portion 35.

Figure 8:
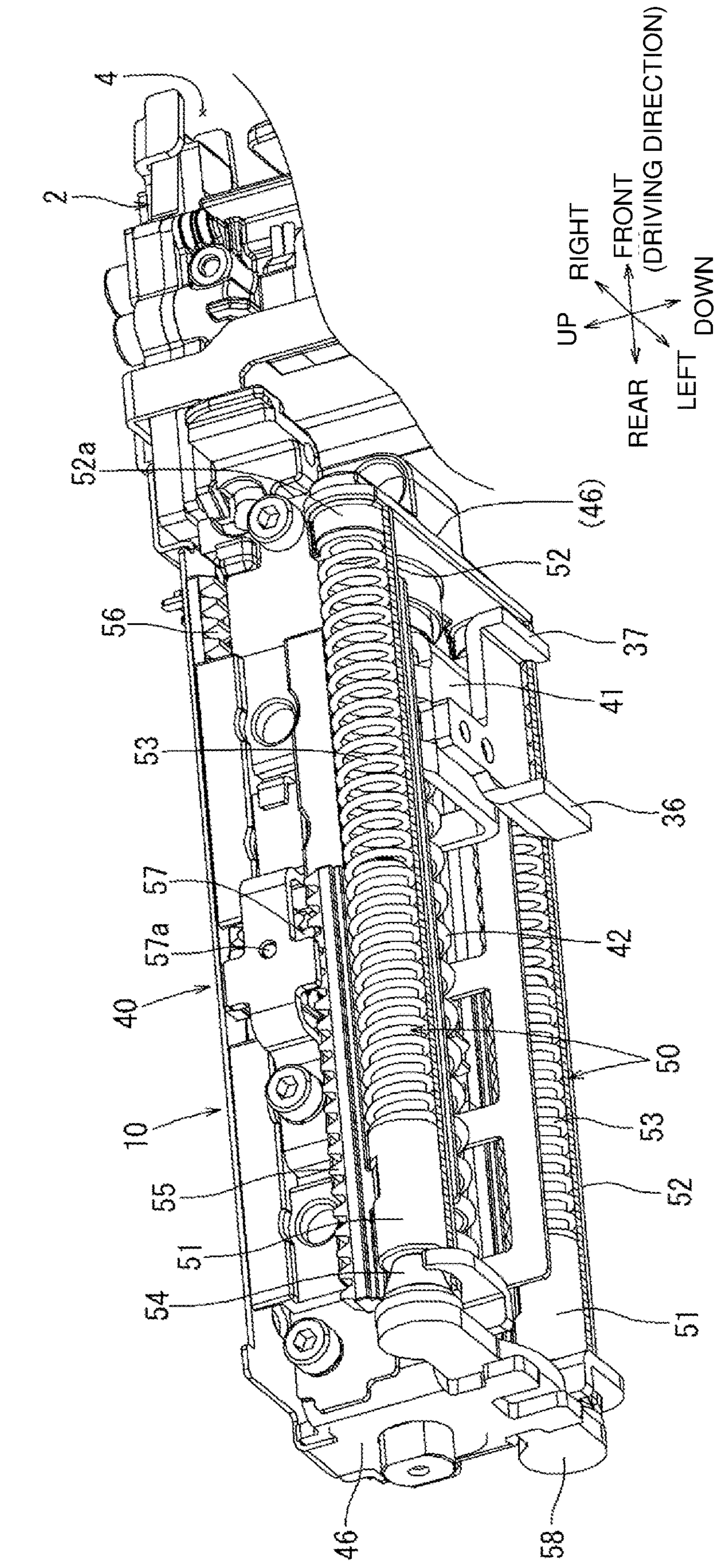
FIG. 8 is a perspective view of the reaction absorbers on the right and left, as viewed from diagonally below.

As shown in FIGS. 5 and 8, the driver base 41 integrally includes, on its lower surface, a first engagement receiver 36 and a second engagement receiver 37 corresponding respectively to the first engagement portion 34 and the second engagement portion 35. The first engagement receiver 36 is located rearward. The second engagement receiver 37 is located frontward from the first engagement receiver 36 by a predetermined distance.

The first engagement receiver 36 and the second engagement receiver 37 protrude downward from the lower surface of the driver base 41. The first engagement receiver 36 protrudes more downward than the second engagement receiver 37. The first engagement receiver 36 protrudes farther downward to receive the lower first engagement portion 34. The second engagement receiver 37 protrudes downward to appropriately engage with the higher second engagement portion 35. Throughout the process of the striking driver 3 displacing in the driving direction and returning in the counter-driving direction, the first engagement portion 34 engages with the first engagement receiver 36 alone and the second engagement portion 35 engages with the second engagement receiver 37 alone.

A single rotation of the lift gear 32 causes the striking driver 3 to return backward. The striking driver 3 returns through a first processing step and a second processing step performed sequentially and successively. In the first processing step, the first engagement portion 34 engages with the first engagement receiver 36. In the second processing step, the second engagement portion 35 engages with the second engagement receiver 37. This causes the driver base 41 and the striking driver 3 to return in two steps from the forward end position to the backward end position against the urging force from the striking spring 42.

FIG. 6 shows the striking driver 3 and the driver base 41 at the backward end position, showing the first engagement receiver 36 and the second engagement receiver 37 with two-dot chain lines. Although not shown in the figure, the striking driver 3 has a standby position (initial position) before reaching the backward end position. When the striking driver 3 is at the standby position, the driving tool 1 is in the initial state.

For the driving tool 1 in the initial state, the driving operation starts in response to the retraction of the contact arm 4 (an on-operation on the contact arm detector 6) and the pull on the trigger 17 (an on-operation on the trigger detector 18) as a condition for operation. In response to the contact arm detector 6 and the trigger detector 18 turned on, electric power is supplied to the electric motor 13 to activate the electric motor 13. In response to the electric motor 13 being activated, the striking driver 3 at the standby position reaches the backward end position as the lift gear 32 rotates.

A backward end sensor 7 detects the striking driver 3 at the backward end position. The backward end sensor 7 is located at the rear of the striker 40. The backward end sensor 7 includes a microswitch. In response to the first engagement receiver 36 approaching the backward end sensor 7, the striking driver 3 at the backward end position is detected.

In response to the backward end sensor 7 turned on, a duration timer that controls an activation duration of the electric motor 13 is activated. The activation duration (time to stop) for the electric motor 13 is set to the time taken for the striking driver 3 to return from the backward end position detected by the backward end sensor 7, passing the forward end position (striking position), to the standby position before reaching the backward end position. The duration timer controls the activation duration of the electric motor 13, allowing the striking driver 3 to return from the forward end position to the standby position (initial position) rearward from the forward end position.

Immediately after the striking driver 3 reaches the backward end position, the lift gear 32 further rotates to cause the second engagement portion 35 to be disengaged from the second engagement receiver 37. This disconnects the power lifting the driver base 41 toward the backward end position against an urging force from the striking spring 42. The driver base 41 thus moves forward under an urging force from the striking spring 42, causing the striking driver 3 to perform a driving operation.

In FIG. 6, the solid line indicates the striking driver 3 in a state immediately after the driving operation, in which the striking driver 3 moves in the driving direction under an urging force from the striking spring 42 and reaches the forward end position. After the driving operation, the electric motor 13 remains activated, causing the lift gear 32 to remain rotating counterclockwise in FIG. 6. The first engagement portion 34 is then pressed against the front surface of the first engagement receiver 36. With the first engagement portion 34 being pressed against the first engagement receiver 36, the lift gear 32 further rotates counterclockwise, causing the first engagement portion 34 to displace backward. The driver base 41 is thus pushed backward against an urging force from the striking spring 42. This lifts the striking driver 3 from the forward end position toward the standby position rearward. In the first processing step in which the first engagement portion 34 engages with the first engagement receiver 36 and the striking driver 3 is lifted, the second engagement portion 35 gradually approaches the second engagement receiver 37.

As the lift gear 32 continues to rotate counterclockwise, the lift operation advances from the first processing step to the second processing step. In the second processing step, the first engagement portion 34 moves away from the front surface of the first engagement receiver 36, whereas the second engagement portion 35 is pressed against the front surface of the second engagement receiver 37. In the second processing step, the power transmission path for the lift operation through the rotation of the lift gear 32 is switched from the first engagement portion 34 to the second engagement portion 35. In the second processing step of the lift operation, the second engagement portion 35 is displaced backward, and the driver base 41 remains lifted backward against an urging force from the striking spring 42 and returns to the standby position. The electric motor 13 is then stopped by the timer function and the driver lifter 30 is stopped. This completes the single driving operation.

The reaction absorbers 50 absorb the reaction caused by the striking driver 3 striking and driving while moving forward. As shown in FIG. 8, the reaction absorbers 50 are located in a pair on the right and left of the striker 40 in a direction perpendicular to the driving direction. The right and left reaction absorbers 50 have the same structure. The right and left reaction absorbers 50 each have a single counterweight 51. The counterweights 51 on the right and left move in a direction (counter-driving direction) opposite to the driving direction, canceling the reaction produced during driving. The reaction absorbers 50 located in a pair on the right and left of the striking driver 3 allow the counterweights 51 to move in a laterally balanced manner.

Each reaction absorber 50 includes the counterweight 51, a guide case 52, a reaction absorbing spring 53, a stopper plate 58, and an elastic member 54. The counterweight 51 moves in the counter-driving direction in synchronization with the striking driver 3 moving in the driving direction. The counterweight 51 accommodated in the guide case 52 is guided in the driving and counter-driving directions. The counterweight 51 is urged in the counter-driving direction by the reaction absorbing spring 53. The reaction absorbing spring 53 is accommodated in the guide case 52. The stopper plate 58 restricts the movable end position of the counterweight 51 in the counter-driving direction. The elastic member 54 absorbs the impact from the counterweight 51 at the movable end position in the counter-driving direction.

The counterweight 51 is cylindrical. The counterweight 51 integrally includes a guide shaft 51*a* with a smaller diameter than the counterweight 51. The guide shaft 51*a* is coaxial with the counterweight 51 and extends frontward. The reaction absorbing spring 53 surrounds the guide shaft 51*a* placed through the inner circumference of the reaction absorbing spring 53. The reaction absorbing spring 53 is located between the front surface of the counterweight 51 and a front wall 52*a* of the guide case 52.

The counterweight 51 and the reaction absorbing spring 53 are accommodated in the guide case 52. The guide case 52 guides the counterweight 51 to move and supports the reaction absorbing spring 53. The guide case 52 is an elongated pipe extending from the front to the rear of the striker 40. The counterweight 51 is movable back and forth in the guide case 52. The guide case 52 has a slit 52*b* in its upper portion. The slit 52*b* extends across the full length of the guide case 52. A follower rack gear 55 engages with the counterweight 51 through the slit 52*b*. The follower rack gear 55 includes meshing teeth facing upward.

A driver rack gear 56 is located above and faces the follower rack gear 55. The driver rack gear 56 is integrally connected to the driver base 41 in the striker 40. The driver rack gear 56 includes meshing teeth facing downward. A single pinion gear 57 is located between the driver rack gear 56 and the follower rack gear 55. The pinion gear 57 is rotatably supported by the striker frame 46 with a support shaft 57*a*. The pinion gear 57 constantly meshes with both the upper driver rack gear 56 and the lower follower rack gear 55.

The follower rack gear 55 thus constantly moves in a direction opposite to the direction in which the driver rack gear 56 moves. The counterweight 51 thus constantly moves in a direction opposite to the direction in which the driver base 41 and the striking driver 3 move in synchronization with the driver base 41 and the striking driver 3. When the driver lifter 30 returns the striking driver 3 in the counter-driving direction, the counterweight 51 moves in the driving direction against the reaction absorbing spring 53. When the striking driver 3 moves in the driving direction under an urging force from the striking spring 42, the counterweight 51 returns in the counter-driving direction under an urging force from the reaction absorbing spring 53.

The striker frame 46 includes the stopper plate 58 at the rear. The stopper plate 58 restricts the movable end position of the counterweight 51 in the counter-driving direction. The elastic member 54 is held between the stopper plate 58 and the rear end of the guide case 52. The elastic member 54 is almost entirely placed in the guide case 52 through the rear opening of the guide case 52. The elastic members 54 on the right and left are each held without slipping off through the rear of the corresponding guide case 52. The elastic member 54 supported on the guide case 52 absorbs the impact from the counterweight 51 at the backward end position, instead of the counterweight 51.

The driving tool 1 according to the present embodiment can switch the driving operation mode between the continuous drive mode and the single drive mode. The driving operation mode is switched with the operation performed on the mode selector switch 26 on the mode display 25. The continuous drive mode and the single drive mode are both performed through the operation of retracting the contact arm 4 and pulling the trigger 17. The two driving operation modes differ in that the order of an on-operation on the contact arm 4 and an on-operation on the trigger 17 determines whether the driving operation is performed.

In response to the retraction (on-operation) of the contact arm 4, the contact arm detector 6 is turned on. This causes an on-signal to be input into the controller 23. In response to the trigger 17 being pulled (on-operation), the trigger detector 18 is turned on. This causes an on-signal to be input into the controller 23.

In the continuous drive mode, the driving operation is performed in response to the retraction of the contact arm 4 and the pull on the trigger 17 performed in any order of these operations. In the initial state in which the striking driver 3 is at the forward end, the electric motor 13 is activated to start the driving operation.

In the single drive mode, the driving operation is performed in response to the retraction of the contact arm 4 first and then the pull on the trigger 17. In the single drive mode, when the trigger 17 is pulled first, the retraction of the contact arm 4 is disabled and no driving operation is performed.

Figure 9:
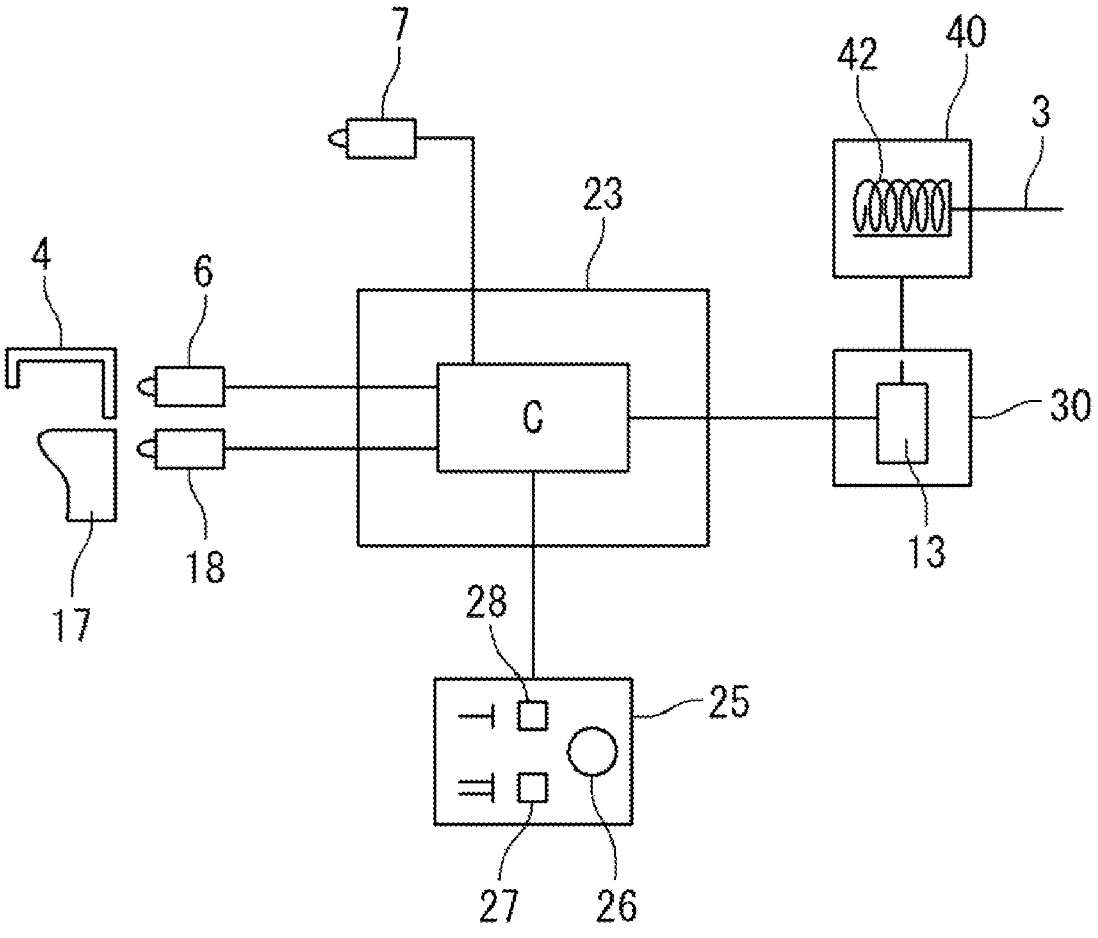
FIG. 9 is a block diagram of a controller.

The controller 23 controls the driving operation. As shown in FIG. 9, the controller 23 includes a control circuit board C. The control circuit board C controls the activation of the electric motor 13 based on an on-signal from the contact arm detector 6 and on an on-signal from the trigger detector 18. In response to an activation of the electric motor 13, the driver lifter 30 lifts the striking driver 3 in the striker 40 from the forward end position (non-operation position), passing the standby position, to the backward end position. The driver lifter 30 is then disengaged from the striking driver 3. The striking driver 3 then moves in the driving direction under an urging force from the striking spring 42. This causes the striking driver 3 to strike the fastener T. In response to the striking driver 3 reaching the backward end position, the backward end sensor 7 is turned on. An on-signal from the backward end sensor 7 is input into the controller 23 to stop the electric motor 13. Although not shown in the figure, the controller 23 includes devices as appropriate, such as a microcomputer and a memory.

The controller 23 receives an operation signal from the mode selector switch 26 on the mode display 25. In response to the input operation signal, for example, the indicator 27 or 28 is illuminated. In response to the switching to the continuous drive mode, the indicator 27 is illuminated. In response to the switching to the single drive mode, the indicator 28 is illuminated.

Figure 10:
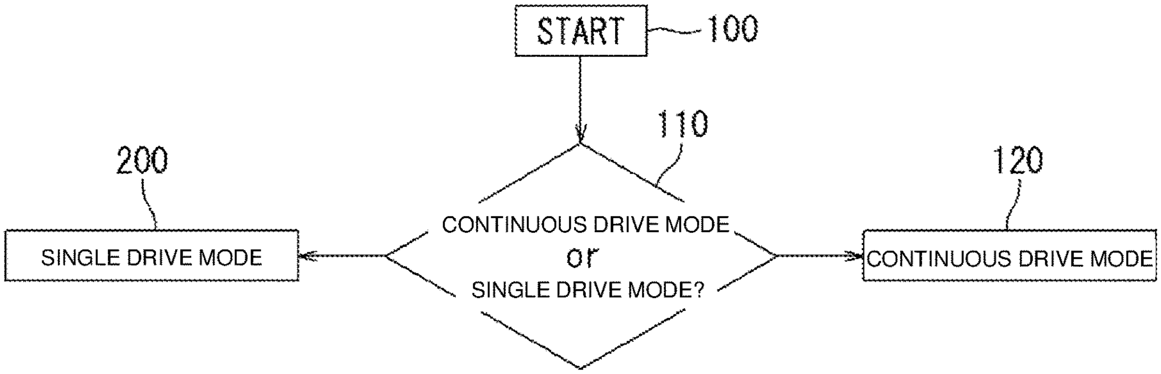
FIG. 10 is a flowchart of control processing performed by the controller.

FIGS. 10 to 13 are flowcharts of example control processing of the driving operation performed by the controller 23. As shown in FIG. 10, for example, after the start in step 100, the operating state of the mode selector switch 26 is determined in step 110. In step 110, the determination is performed as to whether the continuous drive mode or the single drive mode is selected. In response to the continuous drive mode being selected, the control processing in the continuous drive mode in step 120 is performed. In response to the single drive mode being selected, the control processing in the single drive mode in step 200 is performed.

Figure 11:
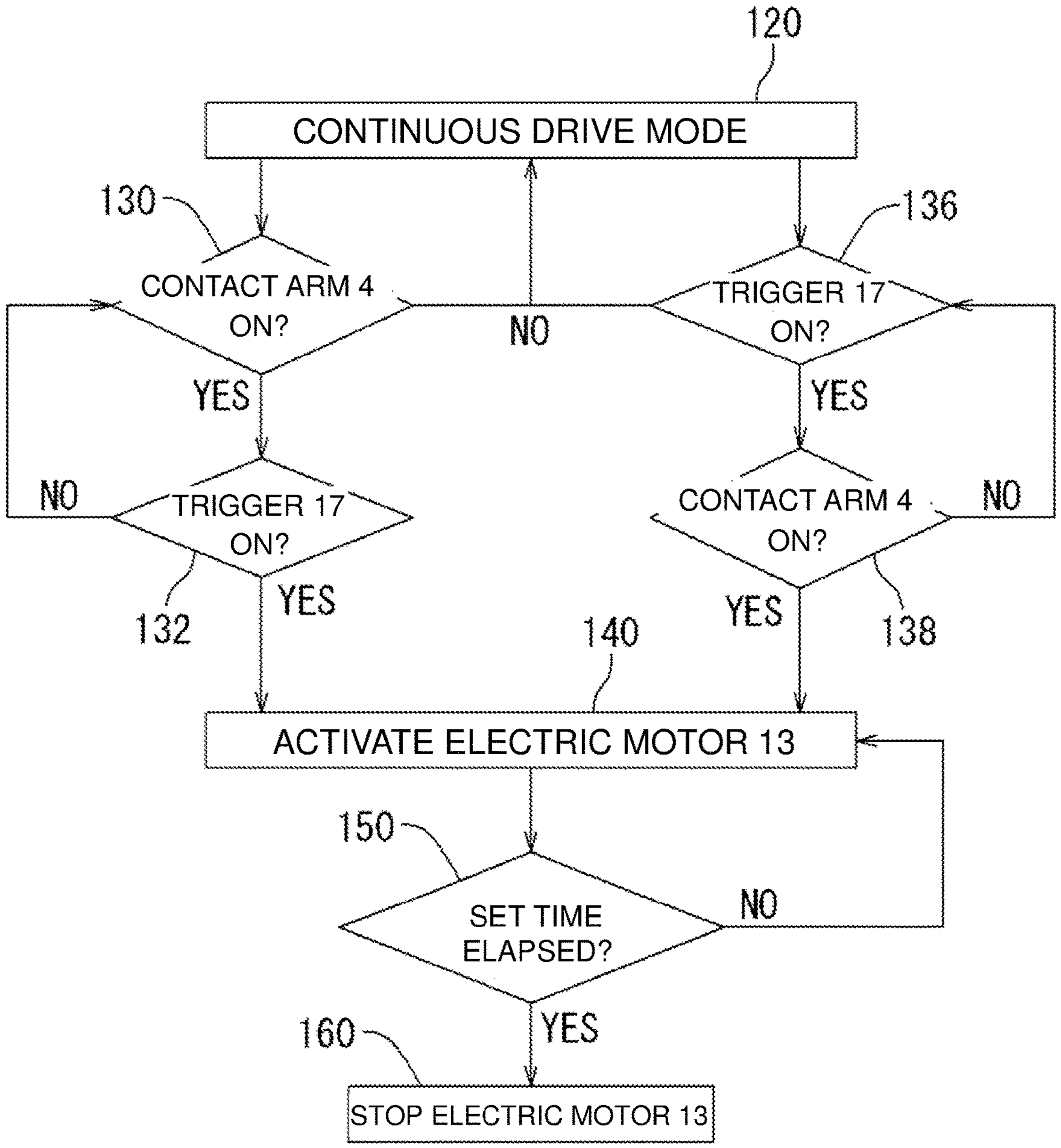
FIG. 11 is a flowchart of control processing in a continuous drive mode.
Figure 12:
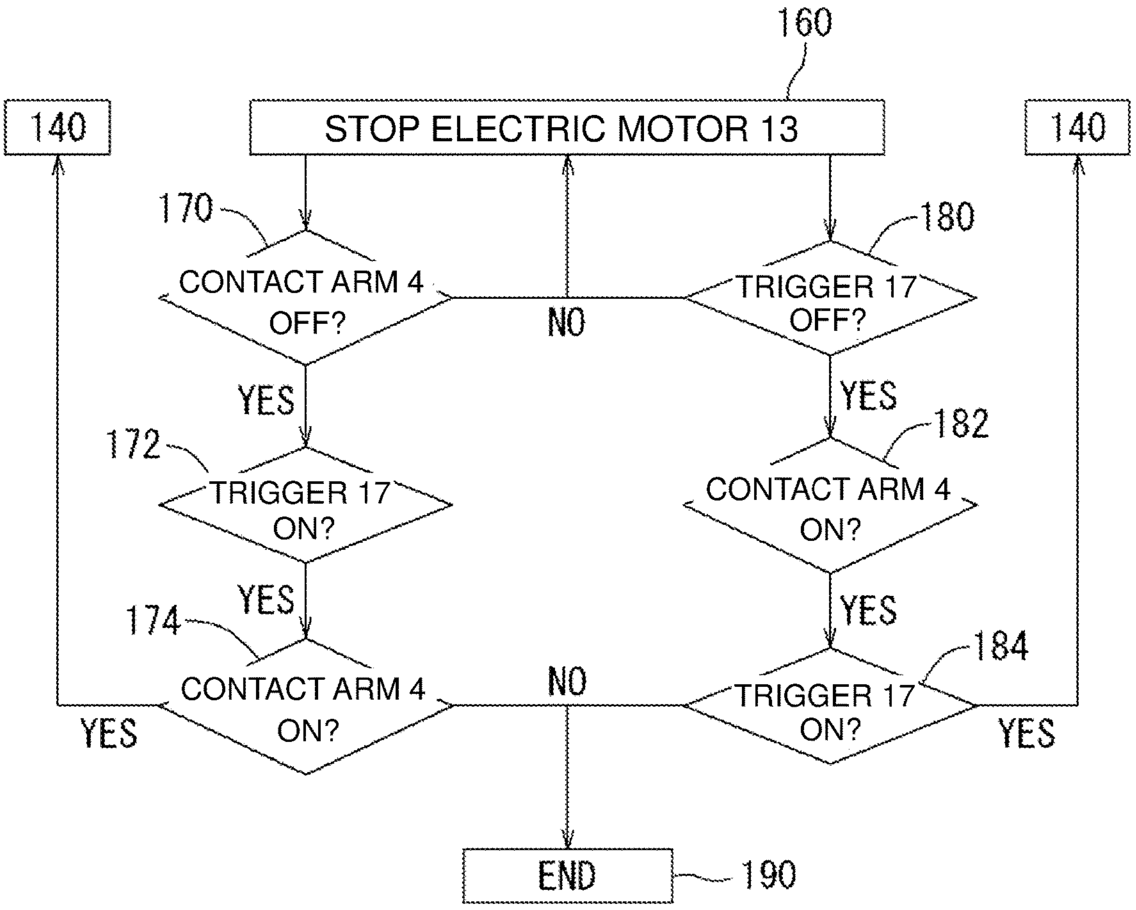
FIG. 12 is a flowchart of control processing in the continuous drive mode.

FIGS. 11 and 12 are flowcharts of the control processing in the continuous drive mode in step 120. In steps 130, 132, 136, and 138, the operating states of the contact arm 4 and the trigger 17 are determined. In response to either the retraction of the contact arm 4 or the pull on the trigger 17 not being performed, the control processing returns to step 120. The retracting operation performed on the contact arm 4 is detected with an on-signal from the contact arm detector 6. The pull on the trigger 17 is detected with an on-signal from the trigger detector 18.

In response to the retraction of the contact arm 4 determined in step 130 and then the pull on the trigger 17 determined in step 132, the electric motor 13 is activated in step 140. In response to the pull on the trigger 17 determined in step 136 and then the retraction of the contact arm 4 determined in step 138, the electric motor 13 is activated in step 140. This activates the driver lifter 30, causing the striking driver 3 to move backward farther from the standby position.

In response to the striking driver 3 reaching the backward end position, the driver lifter 30 is immediately disengaged from the driver base 41, causing the striking driver 3 to move forward in the driving direction. This causes the fastener T to be driven. In the continuous drive mode, the electric motor 13 is activated and the driving operation is performed in response to an on-operation on the contact arm 4 and an on-operation on the trigger 17 performed in any order of the operations.

In response to the striking driver 3 reaching the backward end position, the backward end sensor 7 is turned on. This activates the duration timer for the electric motor 13. The activation duration of the electric motor 13 is controlled by the duration timer. The activation duration of the electric motor 13 is set to the duration for which the striking driver 3 returns from the forward end position to the standby position. In step 150, when the duration timer determines that the set time has elapsed, the electric motor 13 is stopped. The striking driver 3 thus returns to the standby position to complete a single driving operation.

As shown in FIG. 12, after the electric motor 13 is stopped, the operating states of the contact arm 4 and the trigger 17 are determined in steps 170, 172, 174, 180, 182, and 184. In step 170, the contact arm 4 is determined to return to an off-position. When the contact arm 4 remains retracting, the control processing returns to step 160. An off-operation on the trigger 17 is determined in step 180. When the trigger 17 remains pulled, the control processing returns to step 160.

In response to the contact arm 4 being off in step 170, the operating state of the trigger 17 is determined in step 172. In response to the trigger 17 being pulled in step 172, the operating state of the contact arm 4 is determined again in step 174. In response to the contact arm 4 being retracted in step 174, the control processing returns to step 140 and the electric motor 13 is reactivated. This causes the driver lifter 30 to return the striking driver 3 to the backward end position. The striking driver 3 then moves forward, performing the driving operation continuously. The processing in steps 140, 160, 170, and 174 is repeated to perform a series of driving operations, also referred to as a swing driving operation.

In response to the trigger 17 being off in step 180, the operating state of the contact arm 4 is determined in step 182. In response to the contact arm 4 being retracted in step 182, the operating state of the trigger 17 is determined again in step 184. In response to the trigger 17 being pulled in step 184, the control processing returns to step 140 and the electric motor 13 is reactivated, causing a continuous driving operation. The processing in steps 140, 160, 180, and 184 is repeated to perform a drag driving operation.

When the pull on the trigger 17 is not detected in step 172 or the retraction of the contact arm 4 is not detected in step 182, the contact arm 4 is off and the pull on the trigger 17 is released. The control processing thus proceeds to step 190, and the control processing for the series of driving operations in the continuous drive mode is complete.

Figure 13:
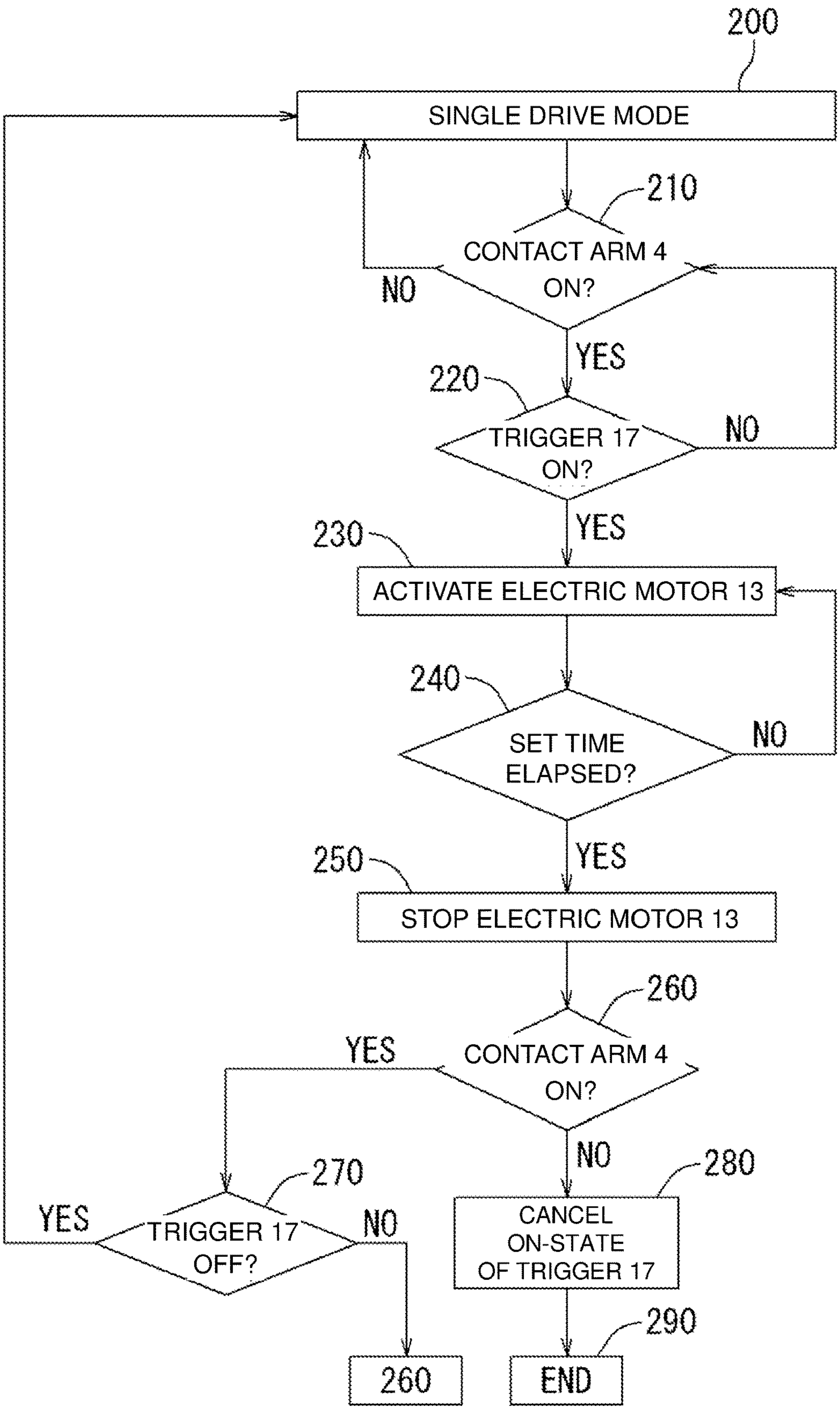
FIG. 13 is a flowchart of control processing in a single drive mode.

FIG. 13 is a flowchart of control processing in the single drive mode in step 200. In the single drive mode, the operating state of the contact arm 4 is first determined in step 210. In response to the contact arm 4 being retracted in step 210, the operating state of the trigger 17 is determined in step 220. In response to the trigger 17 being pulled in step 220, the electric motor 13 is activated in step 230.

In response to the activation of the electric motor 13, the striking driver 3 returns from the forward end position to the backward end position, performing the driving operation. In the single drive mode, the electric motor 13 is activated and the driving operation is performed simply when the contact arm 4 first retracts and then the trigger 17 is pulled. In the single drive mode, when the trigger 17 is pulled first, and the contact arm 4 then retracts, the electric motor 13 is not activated. No driving operation is thus performed.

In the single drive mode as well, the activation duration of the electric motor 13 is determined by the duration timer in step 240. When the set activation duration has elapsed in step 240, the electric motor 13 is stopped in step 250. The striking driver 3 thus returns to the standby position to complete a single driving operation.

After the electric motor 13 is stopped, the operating state of the contact arm 4 is determined in step 260. In response to the contact arm 4 remaining retracted in step 260, the operating state of the trigger 17 is then determined in step 270. In response to the trigger 17 being off in step 270, the control processing returns to step 200. In response to an on-operation performed on the trigger 17 again with the contact arm 4 remaining on after step 200, the electric motor 13 is reactivated in step 230 and the driving operation is performed continuously. The processing in steps 200, 230, 250, 260, and 270 is repeated to perform the drag driving operation.

In the single drive mode, a single driving operation (a single drive) is performed in response to a single pull on the trigger 17. In contrast, in the continuous drive mode, in addition to the drag driving operation, the swing driving operation in which the driving operations are repeatedly performed with the contact arm 4 being repeatedly retracted while a single pull on the trigger 17 is maintained. When the pull on the trigger 17 is not detected in step 270, the control processing returns to step 260.

In response to the retraction of the contact arm 4 being released (the contact arm detector 6 being off) in step 260, the control processing proceeds to step 280, in which the pull on the trigger 17 (on-signal from the trigger detector 18) is canceled. After the contact arm 4 and the trigger 17 are off, the control processing for the series of operations in the single drive mode is complete in step 290.

In the single drive mode, the control processing is complete in response to the retraction of the contact arm 4 being released. In the continuous drive mode, the control processing is complete in response to both the retraction of the contact arm 4 and the pull on the trigger 17 being released.

As described above, the driving tool 1 according to the present embodiment can switch the operation mode between the continuous drive mode and the single drive mode. The controller 23 controls the driving operation based on the detection by the contact arm detector 6 and by the trigger detector 18 and the operating state of the mode selector switch 26.

With the mode selector switch 26 in the continuous drive mode, the driving operation is performed in response to detection by the contact arm detector 6 and detection by the trigger detector 18 performed in any order of the detection. When the mode selector switch 26 is switched to the single drive mode, the driving operation is performed in response to the contact arm detector 6 first detecting the retraction of the contact arm 4 as a condition for operation. When the controller 23 determines that the single drive mode is selected, with an on-operation on the trigger 17 detected first by the trigger detector 18, no driving operation is performed although the contact arm detector 6 subsequently detects the retraction of the contact arm 4. The driving operation mode is switchable in accordance with the work to be performed to increase work efficiency and prevent an unintended driving operation.

The driving tool 1 according to the present embodiment includes the reaction absorbers 50. In each reaction absorber 50, the counterweight 51 moves in the counter-driving direction under an urging force from the reaction absorbing spring 53, thus absorbing the reaction resulting from the striking. This increases the operability and usability of the driving tool 1. The counterweight 51 moves in the counter-driving direction in cooperation with the striking driver 3 moving in the driving direction. This effectively absorbs the reaction resulting from the driving operation.

The driving tool 1 according to the embodiment includes the driver lifter 30. In the driver lifter 30, the first engagement portion 34 and the second engagement portion 35 are sequentially engaged with the driver base 41 that supports the striking driver 3. The striking driver 3 thus returns in the driving direction in a stepwise manner against the striking spring 42. This allows the driver lifter 30 to be compact while the striking driver 3 maintains an intended return distance (travel distance for striking). The first engagement portion 34 and the second engagement portion 35 include engagement pins. This simplifies the mechanical structure of the driver lifter 30.

The embodiment described above may be modified variously. The mode selector switch 26 may be any switch such as a pushbutton switch, a slide switch, or a lever switch. The mode selector switch 26 may be located on, for example, the upper surface, the side surface, or the rear surface of the tool body 10, other than being located on the upper surface of the battery mount 21 as illustrated.

The fastener T may be a U-shaped staple as illustrated, or a rod-like nail.

In the embodiment, the single drive mode allows the drag driving operation in which on-operations are repeatedly performed on the trigger 17 while the contact arm 4 remains on after a single driving operation. However, the mode switching is applicable to the single drive mode in which another driving operation is permitted in response to both the trigger 17 and the contact arm 4 being off after a single driving operation.

The driving tool 1 according to the embodiment is an example of a driving tool in an aspect of the present disclosure. The striking driver 3 in the embodiment is an example of a striking driver in an aspect of the present disclosure. The striking spring 42 in the embodiment is an example of a striking spring in an aspect of the present disclosure. The contact arm 4 in the embodiment is an example of a contact arm in an aspect of the present disclosure. The trigger 17 in the embodiment is an example of a trigger in an aspect of the disclosure. The mode selector switch 26 in the embodiment is an example of a mode selector switch in an aspect of the present disclosure.

REFERENCE SIGNS LIST

W workpiece
T fastener
1 driving tool (rechargeable nailer)
2 driving nose
3 striking driver
3*a* coupling pin
4 contact arm
4*a* detector arm
5 compression spring
6 contact arm detector
7 backward end sensor
10 tool body
11 body housing
12 motor compartment
13 electric motor
14 reduction gear box
14*a* planetary gear train
15 output gear
M motor axis
16 grip
17 trigger
18 trigger detector
19 magazine
19*a* regulator lever
20 power supply
21 battery mount
22 battery pack
23 controller
C control circuit board
25 mode display
26 mode selector switch
27 indicator (continuous drive mode)
28 indicator (single drive mode)
30 driver lifter
31 idler gear
31*a* support shaft
32 lift gear
32*a* support shaft
33 lifter base
34 first engagement portion
35 second engagement portion
36 first engagement receiver
37 second engagement receiver
40 striker
41 driver base
41*a* cylindrical support
42 striking spring
43 support shaft
44 elastic member
45 holding sleeve
46 striker frame
50 reaction absorber
51 counterweight
51*a* guide shaft
52 guide case
52*a* front wall
52*b* slit
53 reaction absorbing spring
54 elastic member
55 follower rack gear
56 driver rack gear
57 pinion gear
57*a* support shaft
58 stopper plate

What is claimed is:

1. A driving tool, comprising:

a striking driver movable in a driving direction to strike a fastener;

a compression coil spring urging the striking driver in the driving direction;

a contact arm movable in a counter-driving direction opposite to the driving direction, the contact arm being movable to a retracted position in the counter-driving direction in response to being pressed against a workpiece;

a trigger movable to an on-position in response to an operation performed by a user; and a mode selector switch operable to switch an operation mode between a continuous drive mode and a single drive mode, wherein in the continuous drive mode, a driving operation is performed in response to the contact arm moving to the retracted position and the trigger moving to the on-position in an order of movement being the contact arm and the trigger or the trigger and the contact arm, and in the single drive mode, the driving operation is performed in response to the contact arm moving to the retracted position and the trigger moving to the on-position in an order of movement being the contact arm and the trigger.

2. The driving tool according to claim 1, further comprising:

a contact arm detector configured to detect the contact arm at the retracted position;

a trigger detector configured to detect the trigger at the on-position; and a controller configured to determine the continuous drive mode or the single drive mode based on a signal from the mode selector switch and to control the driving operation based on a signal from the contact arm detector and a signal from the trigger detector.

3. The driving tool according to claim 2, further comprising:

a counterweight movable in the counter-driving direction in response to the striking driver moving in the driving direction.

4. The driving tool according to claim 3, further comprising:

a reaction-absorbing spring urging the counterweight in the counter-driving direction.

5. The driving tool according to claim 4, further comprising:

a driver lifter configured to return the striking driver in the counter-driving direction, wherein the driver lifter compresses the compression coil spring and the reaction-absorbing spring.

6. The driving tool according to claim 5, wherein the driver lifter includes a plurality of engagement portions configured to sequentially engage with the striking driver to return the striking driver in the counter-driving direction in a stepwise manner.

7. The driving tool according to claim 6, wherein the driver lifter includes a base being rotatable, and the plurality of engagement portions on the base, and the plurality of engagement portions include a plurality of engagement pins.

8. The driving tool according to claim 1, further comprising:

a counterweight movable in the counter-driving direction in response to the striking driver moving in the driving direction.

9. The driving tool according to claim 8, further comprising:

a reaction-absorbing spring urging the counterweight in the counter-driving direction.

10. The driving tool according to claim 9, further comprising:

a driver lifter configured to return the striking driver in the counter-driving direction, wherein the driver lifter compresses the compression coil spring and the reaction-absorbing spring.

11. The driving tool according to claim 10, wherein the driver lifter includes a plurality of engagement portions configured to sequentially engage with the striking driver to return the striking driver in the counter-driving direction in a stepwise manner.

12. The driving tool according to claim 11, wherein the driver lifter includes a base being rotatable, and the plurality of engagement portions on the base, and the plurality of engagement portions include a plurality of engagement pins.

* * * * *